United States Patent
Bennati et al.

(10) Patent No.: US 12,259,985 B2
(45) Date of Patent: Mar. 25, 2025

(54) METHOD, APPARATUS, AND SYSTEM FOR AUTOMATED PURPOSE LIMITATION AND COMPATIBILITY VERIFICATION ON A DATA PLATFORM

(71) Applicant: HERE Global B.V., Eindhoven (NL)

(72) Inventors: Stefano Bennati, Zürich (CH); Henri Kujala, Berlin (DE)

(73) Assignee: HERE Global B.V., Eindhoven (NL)

( * ) Notice: Subject to any disclaimer, the term of this patent is extended or adjusted under 35 U.S.C. 154(b) by 535 days.

(21) Appl. No.: 17/559,550

(22) Filed: Dec. 22, 2021

(65) Prior Publication Data

US 2023/0195917 A1  Jun. 22, 2023

(51) Int. Cl.
*G06F 21/62* (2013.01)
*G06F 16/16* (2019.01)
*G06F 21/60* (2013.01)

(52) U.S. Cl.
CPC ........ *G06F 21/6218* (2013.01); *G06F 16/164* (2019.01); *G06F 21/604* (2013.01)

(58) Field of Classification Search
CPC ... G06F 21/6218; G06F 21/604; G06F 16/164
See application file for complete search history.

(56) References Cited

U.S. PATENT DOCUMENTS

| | | | |
|---|---|---|---|
| 11,328,081 B2 * | 5/2022 | Upadhyay | H04L 63/101 |
| 11,392,578 B1 * | 7/2022 | James | G06F 16/24573 |
| 11,797,705 B1 * | 10/2023 | Voinea | G06F 21/6245 |
| 11,886,429 B2 * | 1/2024 | McPherson | G06F 16/24 |
| 11,899,806 B1 * | 2/2024 | Winters | G06F 16/252 |
| 2018/0025413 A1 | 1/2018 | Rosenthal et al. | |
| 2019/0018985 A1 * | 1/2019 | Rolle | G06F 21/71 |
| 2020/0242631 A1 | 7/2020 | Todd | |
| 2021/0111884 A1 | 4/2021 | Nagao et al. | |
| 2021/0182990 A1 * | 6/2021 | Vidhani | G06Q 40/04 |
| 2022/0292211 A1 * | 9/2022 | Reineke | G06F 21/6218 |

FOREIGN PATENT DOCUMENTS

IN  201721020651 A  12/2018

* cited by examiner

*Primary Examiner* — Han Yang
(74) *Attorney, Agent, or Firm* — DITTHAVONG, STEINER & MLOTKOWSKI

(57) ABSTRACT

An approach is provided for automated purpose limitation and compatibility verification on a data platform. The approach, for example, involves generating metadata that indicates a purpose that has been allowed for processing a dataset. The approach also involves storing the metadata in a metadata catalog to associate the purpose with the dataset. The approach further involves querying the metadata catalog to perform a verification of a compatibility of the purpose with a requested purpose for a new processing activity of the dataset, to perform a limitation of the new processing activity, or a combination thereof.

20 Claims, 11 Drawing Sheets

FIG. 5

| METADATA CATALOG 117 | | | |
|---|---|---|---|
| DATASET 501a | PURPOSE 503a | METHOD OF CREATION 505a | NATURAL LANGUAGE DESCRIPTION 507a |
| DATASET 501b | PURPOSE 503b | METHOD OF CREATION 505b | NATURAL LANGUAGE DESCRIPTION 507b |
| ... | | | |
| DATASET 501n | PURPOSE 503n | METHOD OF CREATION 505n | NATURAL LANGUAGE DESCRIPTION 507n |

METHOD, APPARATUS, AND SYSTEM FOR AUTOMATED PURPOSE LIMITATION AND COMPATIBILITY VERIFICATION ON A DATA PLATFORM

BACKGROUND

Generally, data platforms (e.g., data marketplaces) collect, sell, or otherwise provide access to data to various customers for various uses. Data protection regulations (e.g., the European Union's General Data Protection Regulation (GDPR)) have been developed to limit the use of data according to the purpose of processing, so controls must be in place to prevent misuse of data. Particularly as the volume of data that are managed in these data platforms increase, data providers face significant technical challenges with respect to implementing such controls in a way that can scale.

SOME EXAMPLE EMBODIMENTS

Therefore, there is a need for an approach for providing automated purpose limitation and compatibility verification on data platforms to protect the privacy and security of the collected data and to ensure compliance with application data protection regulations.

According to one embodiment, a method comprises generating metadata that indicates a purpose that has been allowed for processing a dataset. The method also comprises storing the metadata in a metadata catalog to associate the purpose with the dataset. The method further comprises querying the metadata catalog to perform a verification of a compatibility of the purpose with a requested purpose for a new processing activity of the dataset, to perform a limitation of the new processing activity, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to generate metadata that indicates a purpose that has been allowed for processing a dataset. The apparatus is also caused to store the metadata in a metadata catalog to associate the purpose with the dataset. The apparatus is further caused to query the metadata catalog to perform a verification of a compatibility of the purpose with a requested purpose for a new processing activity of the dataset, to perform a limitation of the new processing activity, or a combination thereof.

According to another embodiment, a computer-readable storage medium carries one or more sequences of one or more instructions which, when executed by one or more processors, cause, at least in part, an apparatus to generate metadata that indicates a purpose that has been allowed for processing a dataset. The apparatus is also caused to store the metadata in a metadata catalog to associate the purpose with the dataset. The apparatus is further caused to query the metadata catalog to perform a verification of a compatibility of the purpose with a requested purpose for a new processing activity of the dataset, to perform a limitation of the new processing activity, or a combination thereof.

According to another embodiment, a computer program product may be provided. For example, a computer program product comprising instructions which, when the program is executed by a computer, cause the computer to generate metadata that indicates a purpose that has been allowed for processing a dataset. The computer is also caused to store the metadata in a metadata catalog to associate the purpose with the dataset. The computer is further caused to query the metadata catalog to perform a verification of a compatibility of the purpose with a requested purpose for a new processing activity of the dataset, to perform a limitation of the new processing activity, or a combination thereof.

According to another embodiment, an apparatus comprises means for generating metadata that indicates a purpose that has been allowed for processing a dataset. The apparatus also comprises means for storing the metadata in a metadata catalog to associate the purpose with the dataset. The apparatus further comprises means for querying the metadata catalog to perform a verification of a compatibility of the purpose with a requested purpose for a new processing activity of the dataset, to perform a limitation of the new processing activity, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a diagram illustrating an example data structure of a metadata catalog for associated purposes with datasets, according to one embodiment;

DESCRIPTION OF SOME EMBODIMENTS

Examples of a method, apparatus, and computer program for providing automated purpose limitation and compatibility verification on a data platform are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
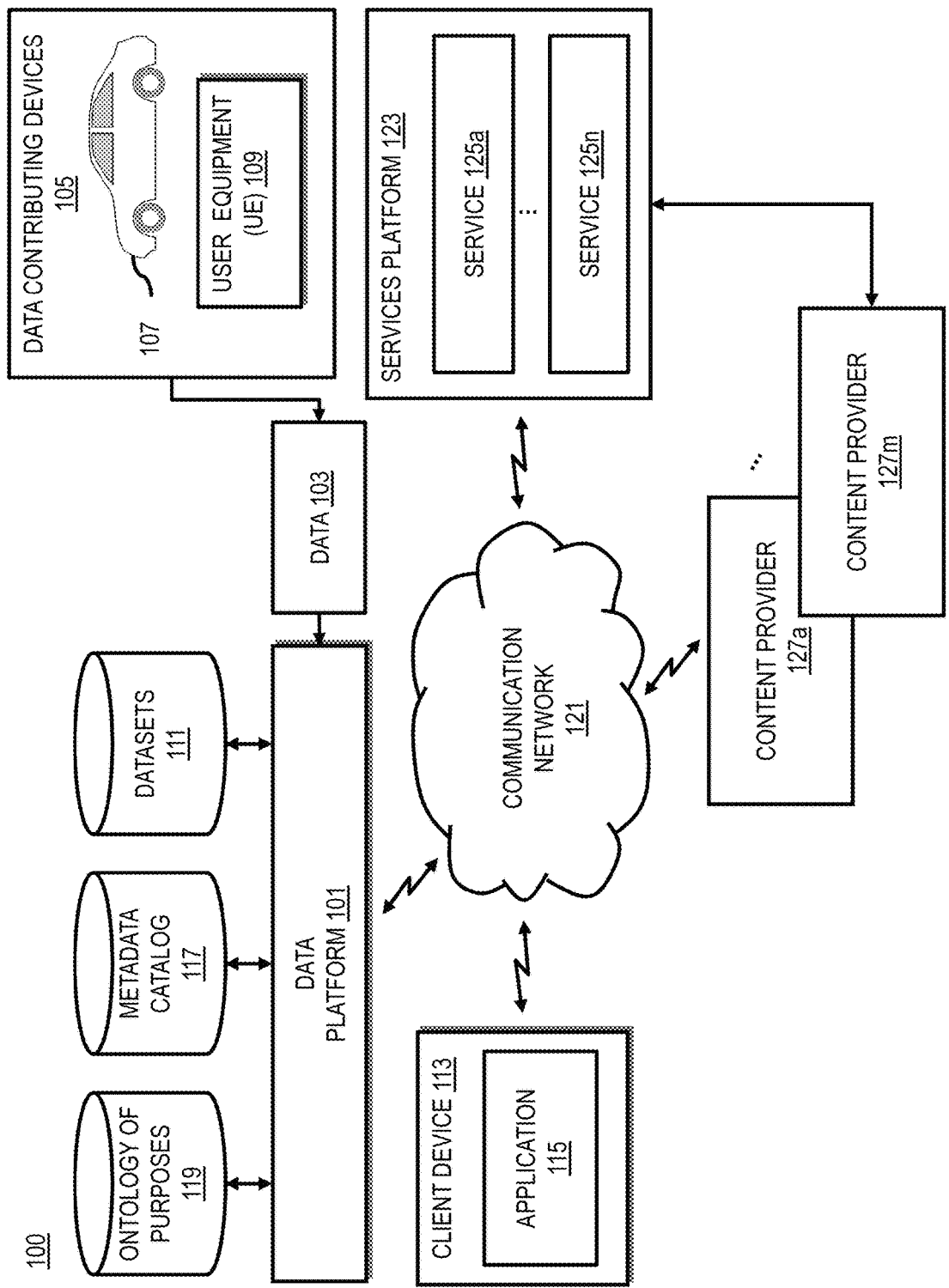
FIG. 1 is a diagram of a system capable of providing automated purpose limitation and compatibility verification on a data platform, according to one embodiment.

FIG. 1 is a diagram of a system capable of providing automated purpose limitation and compatibility verification on a data platform, according to one embodiment. As noted above, in one embodiment, data marketplaces (e.g., a data platform 101) are in the business of collecting data 103 (e.g., any type of data collected from data contributing devices 105 such as but not limited to vehicles 107 and user equipment (UE) devices 109) into datasets 111 and selling the datasets 111 to various customers for various uses (e.g., for processing via client devices 113 executing data applications 115). At the same time, data protection regulations (e.g., the European Union's General Data Protection Regulation (GDPR)) limit the use of the data 103 and/or datasets 111 according to the purpose of processing under which they were originally collected, so controls must be in place to prevent misuse of the data 103 and/or datasets 111.

More specifically, the collection of a specific dataset 111 (e.g., mobility traces or trajectory data collected from the vehicles 107 and/or UEs 109) is associated to a specific purpose (e.g., traffic estimation) which defines the kind of analysis or processing that is performed on the dataset, e.g., service improvement, marketing, etc. The number of associated purposes is limited and typically defined at data collection, e.g., when obtaining consent, in the contract, and/or defined by law.

The dataset can be freely used to perform any of the associated purposes, but the use of the data for other purposes is limited to the set of "compatible purposes" with the original purpose. Any other use can be considered unlawful or otherwise not permitted under the terms of the original data collection. For example, an "incompatibility test" may be required to define if two purposes are compatible.

In one embodiment, the datasets 111 also include derived data that is obtained from an original dataset 111 as result of processing. The derived data is also subject to the same purpose limitations as the original dataset 111, unless "repurposing" happens. For example, the data subjects (e.g., associated with the data contributing devices 105) that provided the original data 103 or corresponding dataset 111 are asked to consent to using the derived data for the new purpose.

Traditional purposes, for instance, are defined in natural language, so they are subject to interpretation. Two purposes that are referring to the same activity could be incompatible if their interpretation differs due to their formulation. Standardization bodies are attempting to create a standard definition of purposes to solve this issue, but such a list will never be complete as new purposes might emerge, e.g., following the introduction of new technology.

In one embodiment, the data platform 101 performs data management functions to manage the datasets 111 and/or data 104 that the data platform 101 has collected and is making available to data users for processing. The data management functions include but is not limited to data governance, data lineage, and consent management. By way of example, data governance is the concept of ensuring the quality, integrity, availability of data throughout the complete data lifecycle, as well as tracking how data changes or whether derivatives are created. One relevant concept is a metadata catalog 117, which lists all available information (metadata) about a specific dataset 111 in a form that can be indexed and automatically processed.

Data lineage is the practice of recording all changes and processing on the datasets 111 and/or data 103 to have an overview of how the datasets 111 and/or data 103 were transformed or cloned throughout the data lifecycle.

Consent management is technology that deals with collecting and managing the consent provided by data subjects (e.g., associated with data contributing devices 105) about the use of their data for a specific purpose. This technology allows to ask data subjects for and collect consent, allows users to revoke consent, and allows the data marketplace (e.g., the data platform 101) to validate the status of consent associated with the datasets 111 and/or data 103.

As described above, the data marketplace/data platform 101 has collected one or more datasets that a data customer wants to acquire for analysis or processing (e.g., via client device 113 and/or application 115 executing on the client device 113). Therefore, providers of the data marketplace or data platform 101 face significant technical challenges with respect to ensuring that the datasets 111 on the data platform 111 meet regulatory requirements and user expectations with respect to ensuring that collected data 103 and/or datasets 111 are not misused for purposes that have been not allowed or consented to by the data subjects. Examples of obligations of the data platform 101 or data marketplace with respect to preventing misuse of data include but are not limited to:

The data marketplace must ensure that the data customer would not perform processing that is incompatible with the original purpose for which the data was collected;

The marketplace must therefore record the original purpose of each dataset, then must ensure that the purpose of the customer is compatible with the original purpose; and The marketplace must also deal with the situation where a new customer is interested in processing the data for a purpose that was previously unknown to the marketplace and the situation where a derived dataset is listed on the marketplace.

To solve these technical challenges, the system 100 extends or otherwise creates a metadata catalog 117 with information about the allowed purposes for processing of specific dataset 111 that have been collected by the data platform 101 or data marketplace. In one embodiment, the metadata catalog 117 enables data customers to search for data that is compatible with their purposes and allows the data platform 101 to ensure that any processing of any of the datasets 111 is compatible with the original purposes. In one embodiment, the system 100 additionally extends the metadata catalog 117 with a description of the method of creation of these purposes, which can be used by data providers/subjects and/or data customers to request repurposing of data.

In one embodiment, these features are enabled by the creation of an ontology of purposes 119 that is maintained by the data marketplace (e.g., the data platform 101). The ontology of purposes 119, for instance, is a database of known or recorded purposes that can be used as a reference for data subjects, data customers, and/or any other user of the data platform 101. In one embodiment, the purposes can be standardized with respect an individual data platform 101, across multiple different data marketplaces, across an industry, across regions, globally, etc.

The various embodiments providing purpose indicating metadata (e.g., via the metadata catalog 117 and optionally based on an ontology of purposes 119) provides for several advantages including but not limited to:

Automated compliance of purpose limitation, e.g., by ensuring that each processing is done on only compatible data;

Support for consent revocation and the creation of additional purposes; and

When the metadata catalog 117 is already in use for non-purpose related metadata, ability to reuse the existing infrastructure of the metadata catalog 117, thus reducing implementation costs and related computing resources (e.g., processor resources, memory, bandwidth, etc.).

In one embodiment, the data customers can include but is not limited to any type service, application, or component with connectivity to the data platform 101 (e.g., connectivity over a communication network 121) that can process, use, or otherwise access the datasets 111, metadata catalog 117, and/or ontology of purposes 119. The services, applications, and/or components can include but are not limited to a services platform 123, one or more services 125a-125n (also referred to as services 125) of the services platform 123, one or more content providers 127a-127m (also referred to as content providers 127), and/or the like.

Figure 2:
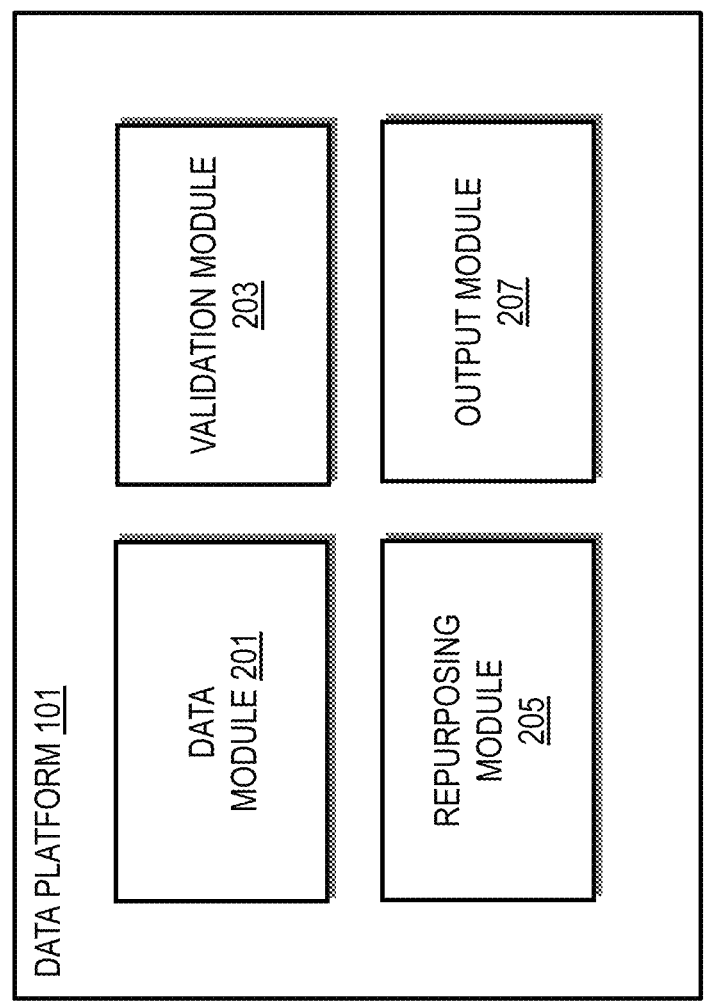
FIG. 2 is a diagram of the components of a data platform capable of purpose limitation and compatibility verification, according to one embodiment.

FIG. 2 is a diagram of the components of the data platform 101, according to one embodiment. The data platform 101 includes one or more components for providing automated purpose limitation and compatibility verification according to the various embodiments described herein. It is contemplated that the functions of these components may be combined or performed by other components of equivalent functionality. As shown, in one embodiment, the data platform 101 includes a data module 201, a validation module 203, a repurposing module 205, and an output module 207. The above presented modules and components of the data platform 101 can be implemented in hardware, firmware, software, or a combination thereof. Though depicted as a separate entity in FIG. 1, it is contemplated that the data platform 101 may be implemented as a module of any of the components of the system 100 (e.g., a component of the services platform 123, services 125, content providers 127, and/or the like). In another embodiment, one or more of the modules 201-207 may be implemented as a cloud-based service, local service, native application, or combination thereof. The functions of the location application 113, location platform 101, and modules 201-207 are discussed with respect to the figures described below.

Figure 3:
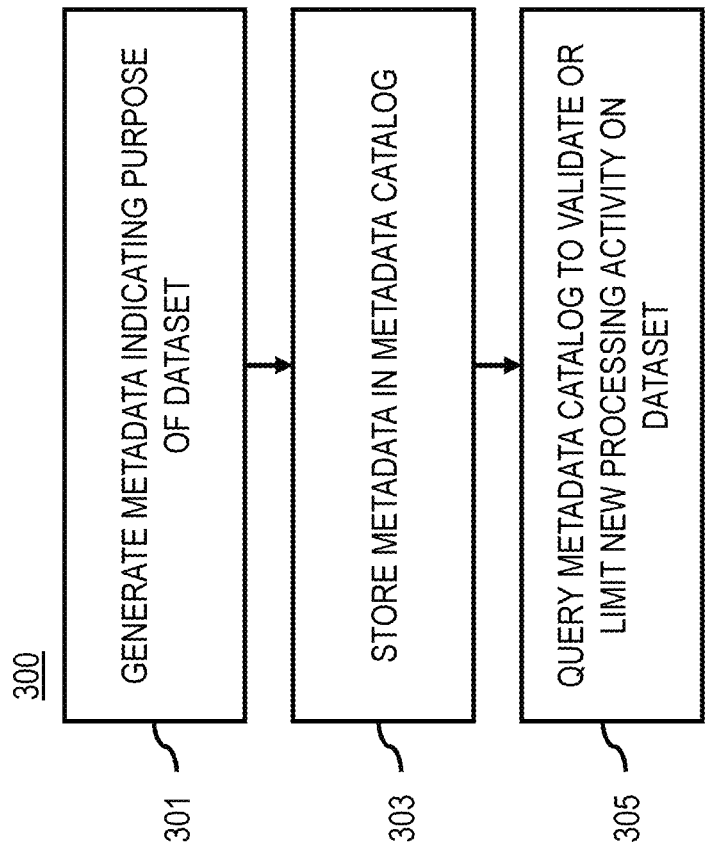
FIG. 3 is a flowchart of a process for providing automated purpose limitation and compatibility verification on a data platform, according to one embodiment.
Figure 10:
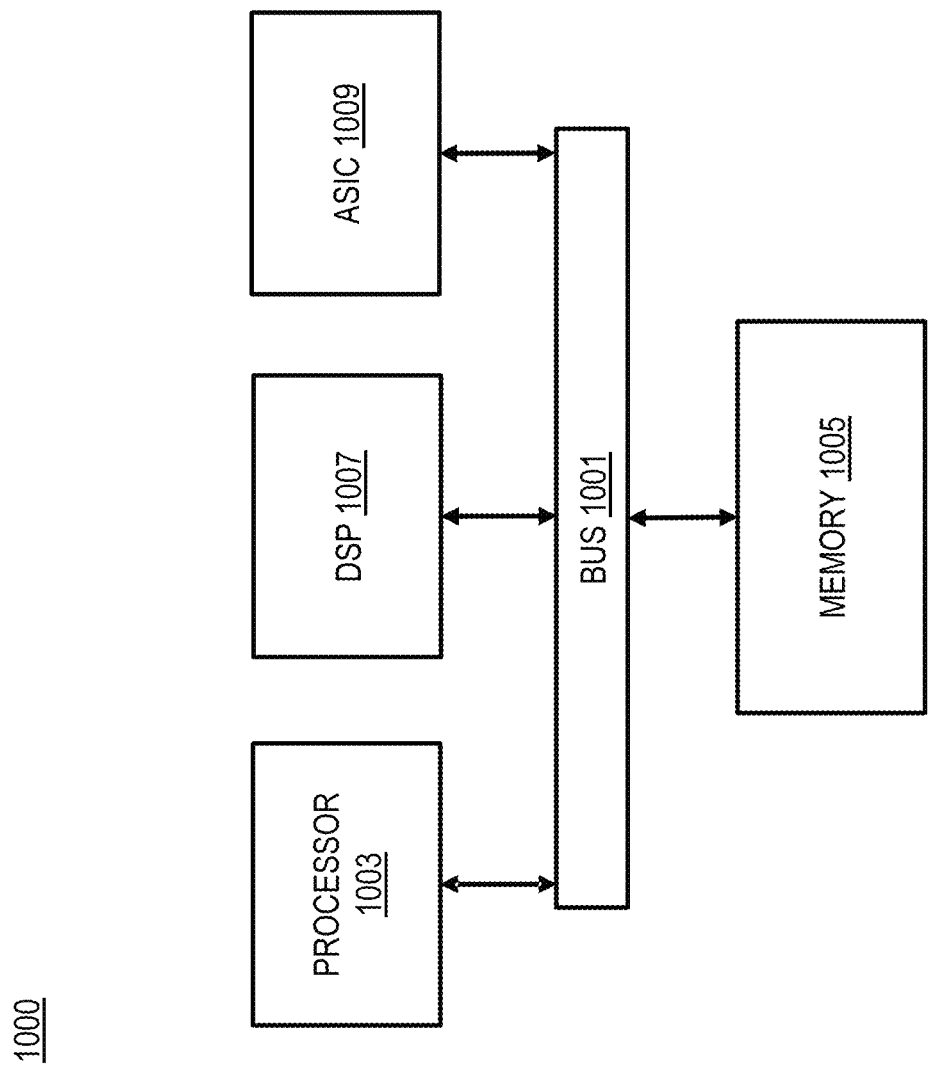
FIG. 10 is a diagram of a chip set that can be used to implement an embodiment of the invention.

FIG. 3 is a flowchart of a process for providing automated purpose limitation and compatibility verification on a data platform, according to one embodiment. In various embodiments, the data platform 101 and/or modules 201-207 may perform one or more portions of the process 300 and may be implemented in, for instance, a chip set including a processor and a memory as shown in FIG. 10. As such, the data platform 101 and/or modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the data module 201 generates metadata that indicates a purpose that has been allowed for processing a given dataset 111. As used herein, the term "metadata" refer to a set of data (e.g., data indicating an allowed purpose of a dataset 111 and/or data 103) that describes and gives information about other data (e.g., the corresponding dataset 111 and/or data 103). It is contemplated that metadata can use any data representation (e.g., such as but not limited to text, numerical, identifier, flag, field, etc.) that is indicative of a purpose or subpurpose associated with a given dataset 111 or data 103.

In one embodiment, the purpose can be selected from the ontology of known purposes 119. The ontology of purposes 119 stores and lists all known to, allowed by, and/or available to the data marketplace (e.g., the data platform 101). The ontology of purposes 119 serves as reference for all data customers and data providers/subjects that want to operate on the data platform 101. As described previously, the ontology of purposes 119 can be specific to the individual data marketplace (e.g., data platform 101), agreed upon by multiple different data marketplaces (e.g., multiple different data platforms 101), standardized by an international organization, and/or the like.

Figure 4:
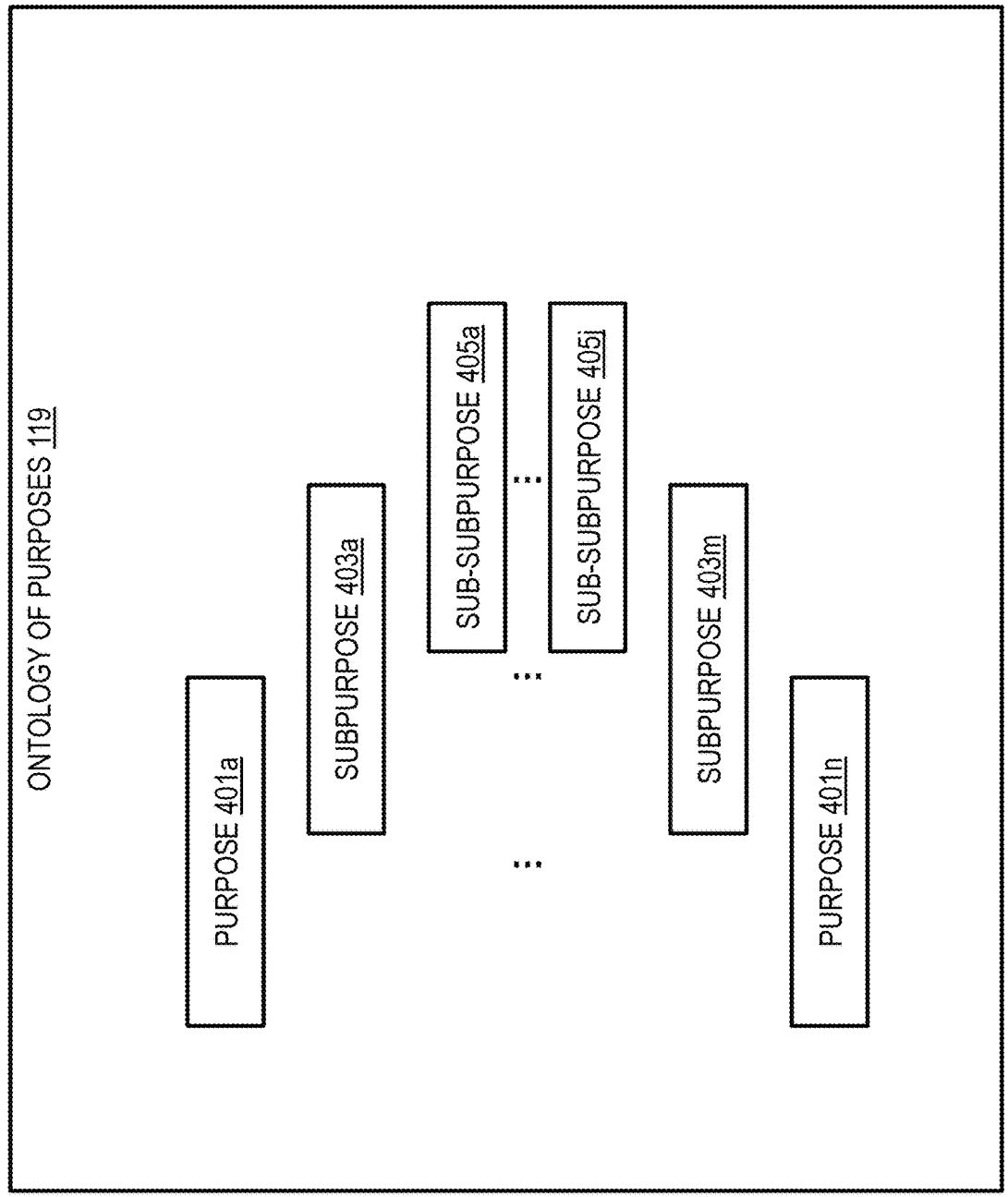
FIG. 4 is a diagram illustrating an example data structure of an ontology of purposes, according to one embodiment.

FIG. 4 is a diagram illustrating an example data structure of the ontology of purposes 119, according to one embodiment. In the example of FIG. 4, the ontology of purposes 119 includes data fields storing respective purposes 401a-401n (also collectively referred to as purposes 401). In one embodiment, the ontology of purposes 119 can have a hierarchical structure in which each purpose 401 can have one or more subpurposes 403a-403m (also collectively referred to as subpurposes 403). It is contemplated that the hierarchy can extend for any number of levels such that each subpurpose 403 can have respective one or more sub-subpurposes 405a-405j (also collectively referred to as sub-subpurpose 405), and so on. In one embodiment, each subpurpose 403 is classified to be compatible with its parent purpose 401, each sub-subpurpose 405 is classified to be compatible with its parent subpurpose 403, and so on. In addition or alternatively, each data filed of any of the purposes 401, subpurposes 403, and/or sub-subpurposes 405 can be linked or classified as compatible with any other purpose 401, subpurpose 403, and/or sub-subpurpose 405 regardless of the hierarchical structure. It is contemplated that the ontology of purposes 119 can be expanded or changed (e.g., modifying or deleting an existing purposes 401, subpurpose 403, and/or sub-subpurpose 405) as new purposes arise from technological innovation or new use cases, or old purposes become obsolete as data processing technology changes.

In one embodiment, a data provider can submit or otherwise provide data 103 to the data platform 101 for inclusion in the datasets available to data customers. A data provider that wants to list their data 103 on the marketplace (e.g., data platform 101) can choose one or more purposes from the ontology and embed them in their contract or consent request with the data subjects (e.g., the users associated with the data contributing devices 105). In one embodiment, a draft formulation for such contracts or consent documents can be provided by the data platform 101 in form of a template, which would then be adapted by the data provider and communicated to the data subjects or customers. In addition, a data consumer that attempts to access a dataset 111 on the data platform 101 would have to specify one or more purposes (e.g., selected from the ontology of purposes 119) for the intended processing of use of the access dataset 111.

In case of self-collected data by the data platform 101, the purposes could be defined by decoding the privacy policies, consent agreements, user preference data, regulations, statutes, and/or the like associated to the data collection.

In case of pre-existing data providers, the purposes can be decoded from the contract between the data provider and the marketplace, or the contract between the data provider and the data subjects. In other words, in one embodiment, the purpose can be parsed from privacy policy data, consent data, contract data, regulatory data, statutory data, or a combination thereof associated with the dataset 111 based on an ontology of known purposes. For example, a trained machine learning model can process the text from the applicable data type and classify the text as belonging to one or more purposes included in the ontology of purposes 119.

In one embodiment, the decoding of the purpose can be based on standardized encoding of the purposes. For example, such encodings can be performed using frameworks for the standardization of privacy policies such as the Layered Privacy Language (LPL) specified in Art. 12-14 of the GDPR (incorporated herein by reference in its entirety) or equivalent. The LPL or any other equivalent language of convention provides a structured approach to creating privacy policies or other documents (e.g., data consent agreements, data collection contracts, data-related regulations, etc.) that are both human and machine-readable. The decoding of the purpose from these documents can be based on the LPL or equivalent structured approach.

In one embodiment, the data module 201 can determine one or more subpurposes that has been allowed for processing the dataset from the ontology of purposes 119 based on the specified purpose and/or a hierarchy or other relationship of the known purposes stored in the ontology of purposes 119. As described above, the ontology of purposes 119 can include data indicating which purposes are compatible with other purposes or subpurposes. As used herein, the term "compatible" refers to one purpose/subpurpose falling within the allowed scope of another purpose/subpurpose. For example, a dataset 111 with an allowed purpose of "traffic monitoring" can be compatible with other purposes such as "traffic speed estimation" or "traffic jam detection." The metadata indicating the purposes of a given dataset 111 can then be generated to further associate the one or more subpurposes (or other compatible purposes) with the dataset 111.

In one embodiment, the data module 201 determines a method of creation of the purpose of the dataset 111. As used herein, the method of creation of the purpose refers to the mechanism by which a data subject or data provider specifies the purpose for which the data subject or the data provider is allowing the data platform 101 or marketplace to collect data and/or process the collected data. By way of example, the method of creation includes but is not limited to by consent, by contract, by law, or a combination thereof. An example of a creating a purpose by consent is presenting a consent agreement that specifies the intended purpose to the data subject (e.g., in a UI interface of a data collection application or equivalent) which gives the data subject an option to accept the consent agreement to initiate to the data collection for the specified purpose and an option to not accept the consent agreement to opt out or cancel the data collection effort. An example of creating a purpose by contract is when a data provider (e.g., who owns or otherwise controls the rights to a collection of datasets) to enter a contract with the providers of the data platform 101 to make the data provider's datasets available on the data platform 101 and marketplace. The contract can specify the purpose which the datasets are being provided. An example of creating a purpose of collected data by law is when a governmental body enacts legislation and/or regulations that mandates certain purposes for data collected from data subjects that must be followed by data platforms 101. The data module 201 can then generate the metadata to further indicate the determined method of creation.

In step 303, the data module 201 stores the metadata in a metadata catalog 117 to associate the purpose with the dataset. In one embodiment, the metadata catalog 117 can be a standalone purpose catalog dedicated to storage of the purpose metadata and/or other related data. In addition or alternatively, the purpose catalog can be an extension of an existing metadata catalog 119 (e.g., created to store other non-purpose metadata associated with the datasets 111 or data 103). In either case, the metadata catalog 119 collects information about the purposes associated with all datasets 111 on the marketplace (e.g., available on the data platform 101).

FIG. 5 is a diagram illustrating an example data structure of a metadata catalog for associated purposes with datasets, according to one embodiment. In the example of FIG. 5, each dataset 501a-501n (also collectively referred to as dataset 501) is tagged with one or more purposes 503a-503n (also collectively referred to as purposes 503) and might include secondary purposes. The purposes 503 can be specified with reference to the ontology of purposes 119 (e.g., the data field of each purpose 503 that is associated with a corresponding dataset 501 can link to a corresponding purpose data field or record in the ontology of purposes 119. For example, for each dataset 501, a subset of purposes in the ontology of purposes 119 is defined, which includes all compatible purposes (e.g., based on a compatibility hierarchy or other defined compatibility relationship among the purposes in the ontology of purposes 119).

As shown, the methods of creation 505a-505n (also collectively referred to as methods of creation 505) of the purposes 503 are also recorded. The methods of creation 505 (e.g., by consent, by contract, by law) can be determined according to the embodiments described above and then recorded a data field of the metadata catalog 117. It is contemplated that any other type of metadata that is descriptive of the origin of the purposes 503 and/or associated data (e.g., any data indicative of or that can facilitate determining repurposing and/or data subject rights) can be recorded. Examples of the additional metadata that can be recorded include but are not limited to: (1) the source devices of the collected data 103 (e.g., from wearable devices, private smartphone/device, corporate smartphone/device, private vehicles, fleet vehicles, emergency vehicles, drones, and/or the like); (2) whether the data 103 was sourced from a data store (e.g., software development kit (SDK)) that supports re-purposing: or (3) legal basis of the purpose 503 (e.g., specific statutes, contracts, agreements, etc.).

Additionally, the metadata catalog 117 can contain a description of the purpose written in natural language (e.g., natural language descriptions 507a-507n—also referred to as natural language descriptions 507), that can be used as a template when drafting consent agreements and/or contracts to create purposes allowed for processing of other collected data. By way of example, the output module 207 can provide the natural language description text as an output template from the metadata catalog 117. The template can then be inserted into a corresponding consent agreement or contract. In one embodiment, the natural language description is optionally included because the purpose 503 specified for each dataset 501 in the metadata catalog 117 can be a reference (e.g., an identifier, link, LPL designation, etc.) to the ontology of purposes 119 that may not necessarily provide enough information for a person unfamiliar with the reference to understand the full contact of the purpose 503. To provide further explanation of each purpose, the natural language description 507 can provide a more expansive explanation in human-readable form. As mentioned, this more expansive description can be drafted in a format that can be inserted (e.g., automatically or manually) as a template into agreements or contracts to create the purpose 503. For example, automatic insertion of the template in to a corresponding agreement, contract, or other equivalent document can via an application program interface (API) of a word processing application, a contract management application, a web portal, or equivalent document preparation application.

In one embodiment, the metadata catalog 117 includes or is expanded to include purpose metadata to enable the automatic verification of purpose compatibility or limitation. For example, in step 305, the validation module 203 queries the metadata catalog to perform a verification of a compatibility of the purpose with a requested purpose for a new processing activity of the dataset, to perform a limitation of the new processing activity, or a combination thereof. In one embodiment, the validation module 203 can recommend an alternate dataset for the new processing activity based on determining that the verification of the compatibility of the requested indicates that the dataset of interest is not compatible. For example, the validation module 203 can query for the metadata catalog 117 for other datasets that have a purpose compatible with the new processing request and present the resulting datasets. In one embodiment, the validation module 203 can rank the results based on similarity of the resulting datasets to the original dataset of interest in the new processing request. The similarity, for instance, can be based on features such as but not limited to: type of data, dataset size, data collection date, data format, etc.

In one embodiment, if the dataset of interest is determined to be not compatible with a requested purpose, the validation module 203 can block download or access to the dataset of interest from the mapping platform 111, disabling certain functions of the mapping platform 101 when using the dataset of interest, and enforcing use of anonymization of the dataset of interest. In another embodiment, the incompatibility determination can automatically trigger a repurposing request to use the dataset of interest for the requested purpose. This process can also include recommending changes to the requested purpose that would make the requested purpose compatible with the dataset of interest. For example, the validation module 203 can query the ontology of purposes 119 to determine subpurposes or other purposes associated with the requested purposes that is compatible with the purposes already allowed for the dataset of interest. These subpurposes and/or other purposes can then be recommended to the user.

Figure 6:
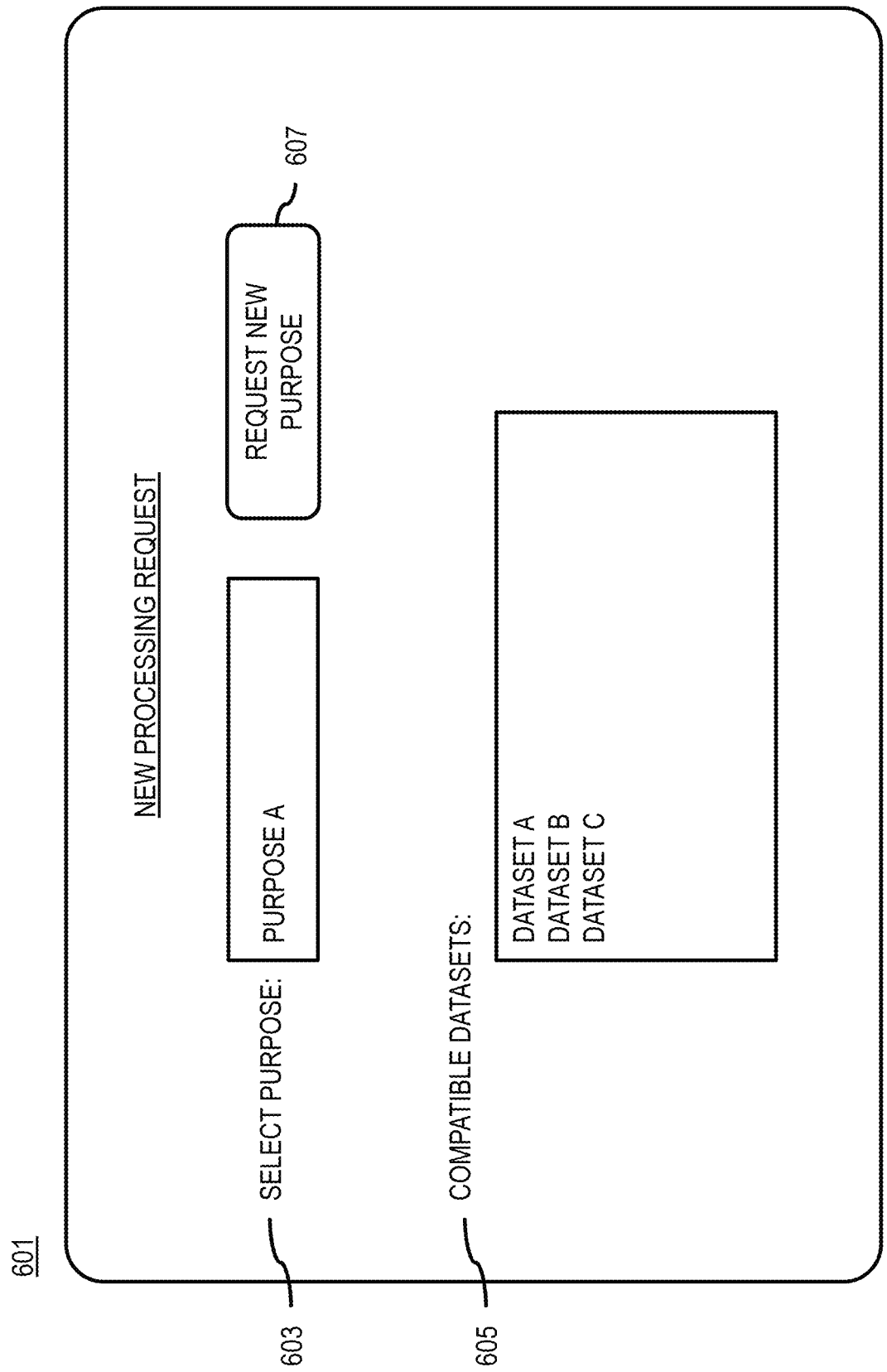
FIG. 6 is a diagram illustrating an example user interface for purpose compatibility validation and limitation, according to one embodiment.

In one embodiment, purpose verification or validation can happen any time a new processing activity is performed or requested to be performed on a given dataset 111 on the data platform 101. In one embodiment, a data consumer that wants to process any of the datasets 111 and/or data 103 on the data platform 101 can register to the data platform 101 and create a new processing request. The data platform 101 can request that the data consumer (e.g., via client device 113) specify one or more purposes from the ontology for the new processing before continuing. FIG. 6 is a diagram illustrating an example user interface (UI) 601 for purpose compatibility validation and limitation, according to one embodiment. As shown, the UI 601 relates to a "New Processing Request" that is being initiated by a data consumer. The UI 601 asks the data consumer to select one or more purposes (e.g., "Purpose A" selected form the ontology of purposes 119) for the new processing request in UI element 603. The validation module 203 then queries the metadata catalog 117 to retrieve one or more datasets that are compatible with the specified purpose (e.g., "Purpose A") and presents the results of the query in UI element 605 (e.g., "Compatible Datasets" listing "Dataset A," "Dataset B," and "Dataset C"). The data consumer can then select one or more compatible datasets to be used for their processing.

If no purpose in the ontology is suitable for the new processing request, the data consumer can request the marketplace to evaluate a new purpose (e.g., by selecting UI element 607 to initiate the new purpose process), which is described below. In one embodiment, this step might require manual intervention by the data marketplace personnel (e.g., legal team) to analyze the new purpose, include it in the ontology of purposes 119 and identify other compatible purposes in the ontology of purposes 119. If the new purpose is not deemed suitable for inclusion in the ontology of purposes 119, an enforcement or limitation process might be triggered to prevent the data customer from processing any data for the specified purpose.

In one embodiment, the processing of a selected dataset 111 can create a derived dataset which includes the data results of the processing or analysis performed by the data consumer. This derived dataset can be stored and directly listed on the data platform 101 as an available dataset 111 that is different from the original dataset 111 from which it was derived. The derived dataset, for instance, can be included in the metadata catalog 117 for the same one or more purposes defined in the original dataset 111 or a subset of the purposes defined in the original dataset 111. Alternatively, the data consumer can ask to repurpose the derived dataset as described below with respect to FIG. 8.

In one embodiment, the data platform 101 enables data consumers to browse available datasets 111 and their associated purposes as listed in the metadata catalog 117. The browsing, for instance, might guide data consumers in finding interesting datasets and tailoring their analysis or processing to compatible purposes. In one embodiment, the output module 207 can generate and/or provide the user interface for browsing, querying, or a combination thereof the dataset of interest among a set of available datasets based on the purpose.

Figure 7:
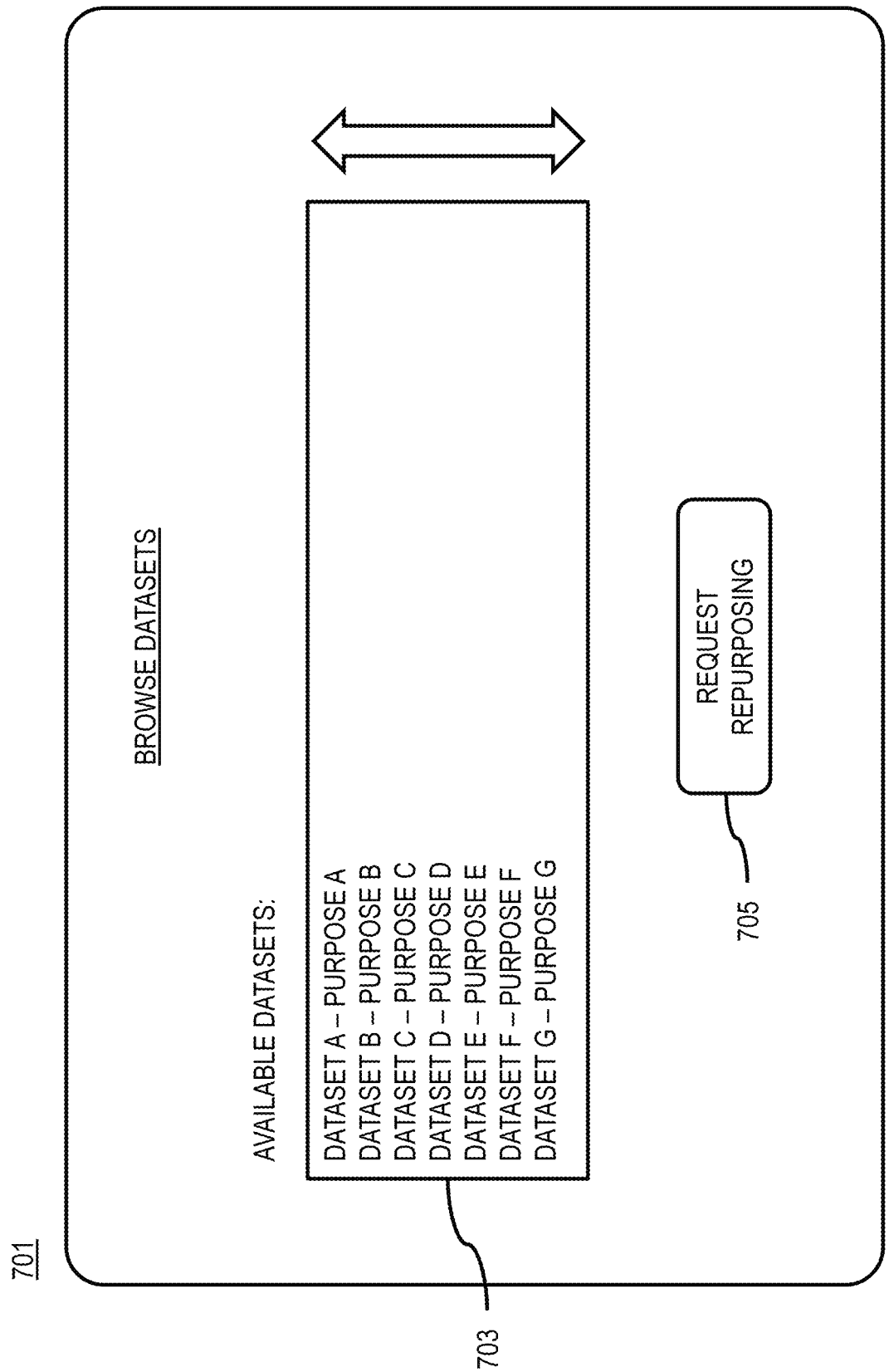
FIG. 7 is a diagram illustrating an example user interface for browsing datasets and their purposes, according to one embodiment.

FIG. 7 is a diagram illustrating an example user interface 701 for browsing datasets and their purposes, according to one embodiment. As shown, the UI 701 displays a UI element 703 that presents a scrollable list of datasets available on the data platform 101 along with associated purposes. The data consumer can scroll through the list and click on a dataset and/or purpose for more detail (not shown). For example, details can include type of data (e.g., vehicle trajectory data, application usage statistics, time of collection, dataset size, etc.). If the data consumer browses to a dataset of interest but the dataset does not list a purpose planned by the data consumer, the data consumer might request a repurposing of a specific dataset of interest (e.g., by selecting UI element to "Request Repurposing") to have a new purpose associated with the dataset as an allowed purpose as described below with respect to FIG. 8.

Figure 8:
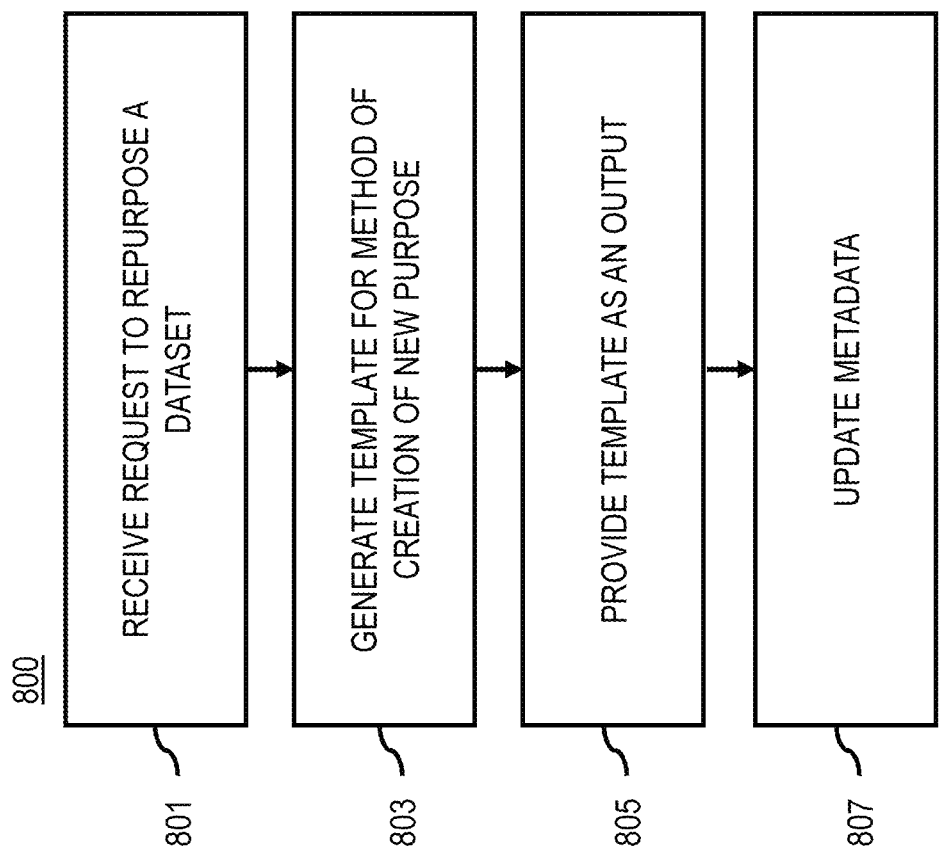
FIG. 8 is a flowchart of a process for repurposing a dataset, according to one embodiment.

FIG. 8 is a flowchart of a process for repurposing a dataset, according to one embodiment. In various embodiments, the data platform 101 and/or modules 201-207 may perform one or more portions of the process 300 and may be implemented in, for instance, a chip set including a processor and a memory as shown in FIG. 10. As such, the data platform 101 and/or modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 801, the repurposing module 205 receives a request to repurpose a dataset by adding a new purpose that is allowed for processing a given dataset. By way of example, the request may be initiated for use cases such as but not limited to: (1) a data provider to change the purpose associated to their datasets 111 listed or otherwise available on the data platform 101; (2) a data consumer to list a derived dataset (result of processing a listed dataset 111) for different purposes; (3) data consumer to request re-purposing a listed dataset 111; or (4) any other scenario or use case in which repurposing of a listed dataset 111 is desired.

In step 803, the repurposing module 205 optionally generates a template for a method of creation (e.g., consent agreement, contract, etc.) for the new purpose. For example, the repurposing module 205 can query or otherwise obtain the method of creation of the currently listed purpose of the dataset 111 of interest or the original dataset 111 in case of a derived dataset from the metadata catalog 117. Then a request to create the purpose can be generated accordingly.

For example, if the method of creation of the purpose is consent, the request would provide the data provider with a template, e.g., a text describing a consent request for the new purpose, which the data provider could forward to the data subjects. In one embodiment, output module 207 provides the template as an output. As described above, the template can be generated from the natural language description associated with the purpose, a compatible purpose, or entered by the entity requesting the repurposing. A fraction of the data subjects might grant consent for the new purpose, so a derived dataset containing only data from these subjects who have consented to the new purpose will be listed on the data platform 101 allowing the additional purpose. In other words, the repurposing module 205 updates the metadata associated with the dataset or a derived dataset in the metadata catalog with the new purpose (step 807).

In another example, if the method of creation of the purpose is contract, the request would provide a template, e.g., a contract modification to the data provider, (step 805) which the provider might accept (or its customers might accept). In this case, a new dataset containing only data obtained after the new contract was in force will be listed on the data platform 101 allowing the additional purpose (step 807).

In one embodiment, an additional use case of the various embodiments of the repurposing process 800 is to ensure compliance with consent revocations by data subjects. For example, a data subject might at any time revoke the consent to process their data for one or more purposes. The data platform 101 must ensure that the data with revoked consent is not further processed.

The ensure this, the process 800 enables a data provider to communicate with the data platform 101 (e.g., via a repurposing request as described above) that consent for a specific purpose has been revoked for a subset of their data listed on the data platform 101. In this case, a derived dataset that does not contain the subset of data with the revoked purposed will be created. Accordingly, the derived dataset will not include any data which does not support the purpose specified in the request.

In one embodiment, to reduce the memory footprint or requirements for storing derived datasets, the splitting of the original dataset 111 between a set with all data and set without revoked data might be performed at the application level such that data duplication is not required.

Returning to FIG. 1, as shown, the system 100 includes a data platform 101 for providing automated purpose limitation and compatibility verification. In one embodiment, the data platform 101 has connectivity over the communication network 121 to the client device 113 (e.g., executing a client application 115), the services platform 123 that provides one or more services 125 that can use the metadata catalog 117, ontology of purposes 119, and/or datasets 111 to perform one or more functions. By way of example, the services 125 may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 125 uses the output of the data platform 101 (e.g., metadata catalog 117, ontology of purposes 119, datasets 111, and/or related data) to provide services 125 such as navigation, mapping, other location-based services, etc. to the client device 113 and/or any of the data contributing devices 105 (e.g., vehicles 107 and/or UEs 109).

In one embodiment, the data platform 101 may be a platform with multiple interconnected components. The data platform 101 may include multiple servers, intelligent networking devices, computing devices, components, and corresponding software for combining location data sources according to the various embodiments described herein. In addition, it is noted that the data platform 101 may be a separate entity of the system 100, a part of the one or more services 125, a part of the services platform 123, or included within components of the client device 113, the application 115 executing on the client device 113, and/or the data contributing devices 105.

In one embodiment, content providers 127 may provide content or data (e.g., datasets 111, metadata catalog 117, datasets 111, etc.) to the data platform 101, the services platform 123, the services 125, the client devices 113, and/or the data contributing devices 105. The content provided may be any type of content, such as purpose data, purpose templates (e.g., consent agreement templates, contract templates, etc.), map content, textual content, audio content, video content, image content, etc. In one embodiment, the content providers 127 may provide content that may aid in automated purpose limitation and compatibility verification on the data platform 101 according to the various embodiments described herein. In one embodiment, the content providers 127 may also store content data platform 101, services platform 123, services 125, and/or any other component of the system 100. In another embodiment, the content providers 127 may manage access to a central repository of data, and offer a consistent, standard interface to data, such as a repository of the datasets 111, metadata catalog 117, and/or ontology of purposes 119.

In one embodiment, the data contributing devices 105 (e.g., vehicles 107 and/or UEs 109) may execute software applications to provide data and selected purposes (e.g., from the ontology of purposes 119) to the data platform 101 according to the embodiments described herein. By way of example, the data collection applications of the data contributing devices 105 may be any type of application that is executable on the data contributing devices 105, such as autonomous driving applications, routing applications, mapping applications, location-based service applications, navigation applications, device control applications, content provisioning services, camera/imaging application, media player applications, social networking applications, calendar applications, and the like. In one embodiment, the applications 115 of the client device 113 may act as a client for the data platform 101 and perform one or more functions associated with automated purpose limitation and compatibility verification alone or in combination with the data platform 101.

By way of example, the data contributing devices 105 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the data contributing devices 105 can support any type of interface to the user (such as "wearable" circuitry, etc.). In one embodiment, the data contributing devices 105 may be associated with or be a component of a vehicle or any other device.

In one embodiment, the data contributing devices 105 are configured with various sensors for generating or collecting environmental image data, related geographic data, and/or any other type of data collected and made available by the data platform 101. In one embodiment, the collected data represent sensor data associated with a geographic location or coordinates at which the sensor data was collected (e.g., trajectory or probe data. By way of example, the sensors of the data contributing devices 105 may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the data contributing devices 105 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the data contributing devices 105 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the data contributing devices 105 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the data platform 101, client devices 113, services platform 123, services 125, data contributing devices 105, and/or content providers 127 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for providing automated purpose limitation and compatibility verification on a data platform 101 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
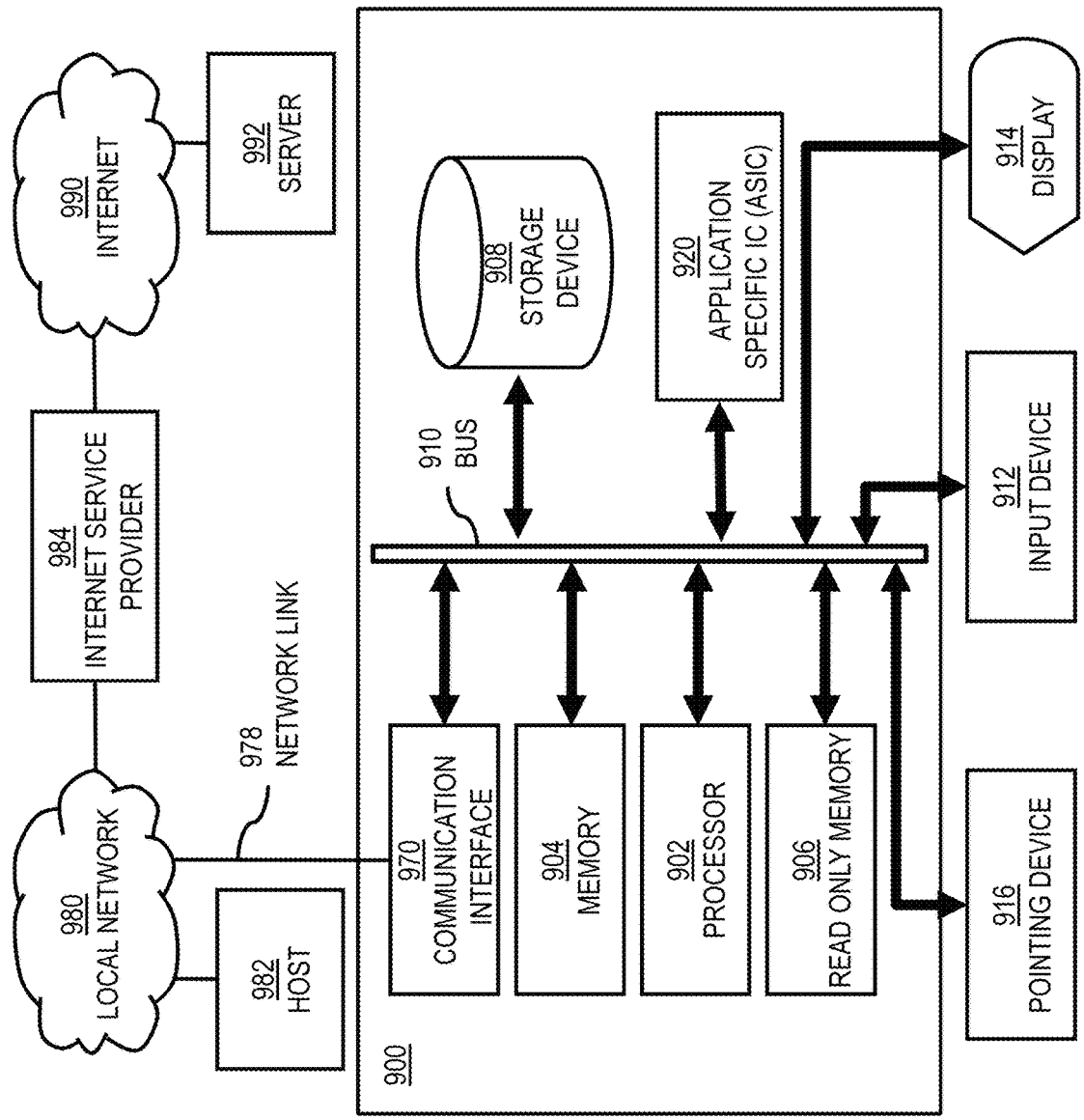
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to provide automated purpose limitation and compatibility verification on a data platform 101 as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing automated purpose limitation and compatibility verification on a data platform 101. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing automated purpose limitation and compatibility verification on a data platform 101. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing automated purpose limitation and compatibility verification on a data platform 101, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 121 for providing automated purpose limitation and compatibility verification on a data platform 101.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to provide automated purpose limitation and compatibility verification on a data platform 101 as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide automated purpose limitation and compatibility verification on a data platform 101. The memory 1005 also stores the data associated with or generated by the execution of the inventive steps.

Figure 11:
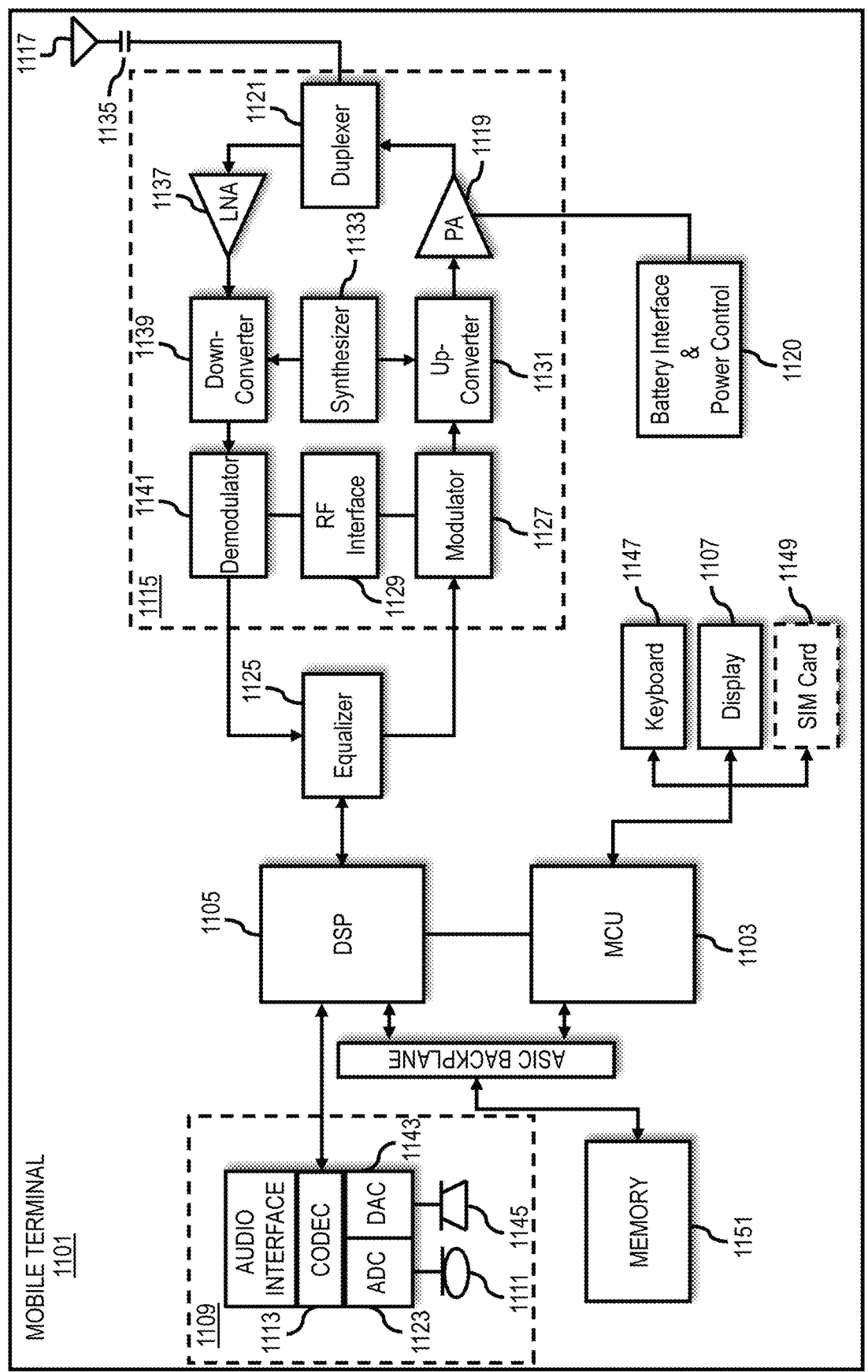
FIG. 11 is a diagram of a mobile terminal (e.g., handset) that can be used to implement an embodiment of the invention.

FIG. 11 is a diagram of exemplary components of a mobile terminal (e.g., client device 113, data contributing devices 105, or components thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide automated purpose limitation and compatibility verification on a data platform 101. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   generating metadata that indicates (1) a purpose that has been allowed for processing a dataset, and (2) a method of creation of the purpose, wherein the method of creation of the purpose is a mechanism by which the purpose is specified;
   storing the metadata in a metadata catalog to associate the purpose with the dataset; and
   querying the metadata catalog to perform a verification of a compatibility of the purpose with a requested purpose for a new processing activity of the dataset, to perform a limitation of the new processing activity, or a combination thereof.

2. The computer-implemented method of claim 1, wherein the method of creation is selected from among a first mechanism comprising by consent and a second mechanism comprising by contract.

3. The computer-implemented method of claim 1, wherein the method of creation includes by consent, by contract, by law, or a combination thereof.

4. The computer-implemented method of claim 1, wherein the purpose is selected from an ontology of known purposes.

5. The computer-implemented method of claim 1, wherein the purpose is parsed from privacy policy data, consent data, contract data, or a combination thereof associated with the dataset based on an ontology of known purposes.

6. The computer-implemented method of claim 1, further comprising:
   determining one or more subpurposes that has been allowed for processing the dataset from an ontology of known purposes based on the purpose and a hierarchy of the known purposes in the ontology,
   wherein the metadata further associates the one or more subpurposes with the dataset.

7. The computer-implemented method of claim 1, wherein the metadata catalog includes a natural language description text of the purpose.

8. The computer-implemented method of claim 7, further comprising:
   providing the natural language description text as an output template from the metadata catalog.

9. The computer-implemented method of claim 1, further comprising:
   providing a user interface for browsing, querying, or a combination thereof the dataset among a set of available datasets based on the purpose.

10. The computer-implemented method of claim 1, further comprising:
    receiving a request to repurpose the dataset by adding a new purpose that is allowed for processing the dataset;
    generating a template for a method of creation of the new purpose; and
    providing the template as an output.

11. The computer-implemented method of claim 1, further comprising:
    receiving a request to revoke the purpose for a subset of the dataset;
    generating a derived dataset that does not contain the subset of the dataset associated with the request; and
    updating the metadata catalog to associate the metadata indicating the purpose with the derived dataset.

12. The computer-implemented method of claim 1, wherein the processing of the dataset results in a derived dataset, the method further comprising:
    updating the metadata catalog to associate the metadata indicating the purpose with the derived dataset.

13. The computer-implemented method of claim 1, further comprising:
    recommending an alternate dataset for the new processing activity based on determining that the verification of the compatibility of the requested indicates that the dataset is not compatible.

14. An apparatus comprising:
    at least one processor; and
    at least one memory including computer program code for one or more programs, the at least one memory and the computer program code configured to, with the at least one processor, cause the apparatus to perform at least the following,
    generate metadata that indicates (1) a purpose that has been allowed for processing a dataset, and (2) a method of creation of the purpose, wherein the method of creation of the purpose is a mechanism by which the purpose is specified;
    store the metadata in a metadata catalog to associate the purpose with the dataset; and
    query the metadata catalog to perform a verification of a compatibility of the purpose with a requested purpose for a new processing activity of the dataset, to perform a limitation of the new processing activity, or a combination thereof.

15. The apparatus of claim 14, wherein the method of creation is selected from among a first mechanism comprising by consent and a second mechanism comprising by contract.

16. The apparatus of claim 14, wherein the method of creation includes by consent, by contract, by law, or a combination thereof.

17. The apparatus of claim 14, wherein the purpose is selected from an ontology of known purposes.

18. A non-transitory computer-readable storage medium carrying one or more sequences of one or more instructions which, when executed by one or more processors, cause an apparatus to perform:
- generating metadata that indicates (1) a purpose that has been allowed for processing a dataset, and (2) a method of creation of the purpose, wherein the method of creation of the purpose is a mechanism by which the purpose is specified;
- querying the metadata catalog to perform a verification of a compatibility of the purpose with a requested purpose for a new processing activity of the dataset, to perform a limitation of the new processing activity, or a combination thereof.

19. The non-transitory computer-readable storage medium of claim 18, wherein the method of creation is selected from among a first mechanism comprising by consent and a second mechanism comprising by contract.

20. The non-transitory computer-readable storage medium of claim 18, wherein the method of creation includes by consent, by contract, by law, or a combination thereof.

* * * * *